(12) United States Patent
Feng et al.

(10) Patent No.: US 11,715,090 B2
(45) Date of Patent: *Aug. 1, 2023

(54) PAYMENT METHOD, APPARATUS AND DEVICE

(71) Applicant: ADVANCED NEW TECHNOLOGIES CO., LTD., Grand Cayman (KY)

(72) Inventors: Taiming Feng, Hangzhou (CN); Yingde Liu, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,106

(22) Filed: Jul. 8, 2022

(65) Prior Publication Data

US 2022/0343316 A1 Oct. 27, 2022

Related U.S. Application Data

(63) Continuation of application No. 16/903,210, filed on Jun. 16, 2020, now Pat. No. 11,468,426, which is a (Continued)

(30) Foreign Application Priority Data

Jan. 12, 2018 (CN) .......................... 201810029073.1

(51) Int. Cl.
*G06Q 20/32* (2012.01)
*G06K 7/14* (2006.01)
(Continued)

(52) U.S. Cl.
CPC ....... *G06Q 20/3274* (2013.01); *G06K 7/1417* (2013.01); *G06K 19/06037* (2013.01);
(Continued)

(58) Field of Classification Search
None
See application file for complete search history.

(56) References Cited

U.S. PATENT DOCUMENTS 7,255,264 B2 8/2007 De Leon
7,434,723 B1 10/2008 White et al.
(Continued)

FOREIGN PATENT DOCUMENTS

CN 103337023 A 10/2013
CN 103514539 A 1/2014
(Continued)

OTHER PUBLICATIONS

"Payments and Banking, Making Local Payments Abroad, Aug. 15, 2017, Harvard GSS, 3-7" (Year: 2017).*

*Primary Examiner* — Kito R Robinson
*Assistant Examiner* — Toan Duc Bui

(57) ABSTRACT

A payment method, apparatus, and device are provided. The method includes: determining, according to geographical location information of a user, a third-party payment institute corresponding to the user's location, obtaining, through a payment server, a payment account of the third-party payment institute compatible for a local transaction, and scanning a barcode to complete a payment using the payment account. During the payment process, a DOI including information of the payment account is presented to a merchant, and the merchant extracts the payment account therein, and forwards order information and the payment account to the third-party payment institute. The third-party payment institute identifies the payment account and forwards the same to the payment server. The payment server identifies a user identity corresponding to the payment account, and then completes the payment process.

16 Claims, 7 Drawing Sheets

Related U.S. Application Data continuation of application No. PCT/CN2019/070779, filed on Jan. 8, 2019.

(51) Int. Cl.

| | | |
|---|---|---|
| *G06K 19/06* | (2006.01) |
| *G06Q 10/10* | (2023.01) |
| *G06Q 20/02* | (2012.01) |
| *G06Q 20/10* | (2012.01) |
| *G06Q 20/40* | (2012.01) |
| *G06Q 40/02* | (2023.01) |
| *H04L 67/12* | (2022.01) |
| *H04L 67/52* | (2022.01) |
| *H04L 67/53* | (2022.01) |
| *G06Q 20/34* | (2012.01) |

(52) U.S. Cl.
CPC .............. *G06Q 10/10* (2013.01); *G06Q 20/02* (2013.01); *G06Q 20/108* (2013.01); *G06Q 20/4014* (2013.01); *G06Q 40/02* (2013.01); *H04L 67/12* (2013.01); *H04L 67/52* (2022.05); *H04L 67/53* (2022.05); *G06Q 20/342* (2013.01)

(56) References Cited

U.S. PATENT DOCUMENTS

| | | | |
|---|---|---|---|
| 7,539,500 B2 | 5/2009 | Chiang | |
| 8,635,157 B2 | 1/2014 | Smith et al. | |
| 8,818,868 B2 | 8/2014 | Faires et al. | |
| 10,096,006 B2 | 10/2018 | Loevenguth et al. | |
| 10,366,385 B1 | 7/2019 | Ramalingam | |
| 10,909,525 B1* | 2/2021 | Dhodapkar | G06Q 20/3278 |
| 2005/0216406 A1* | 9/2005 | Obadan | G06Q 20/1085 705/45 |
| 2010/0042539 A1* | 2/2010 | Dheer | G06Q 20/102 705/40 |
| 2012/0239553 A1 | 9/2012 | Gonan et al. | |
| 2013/0254115 A1 | 9/2013 | Pasa et al. | |
| 2013/0297509 A1 | 11/2013 | Sebastian et al. | |
| 2013/0346173 A1* | 12/2013 | Chandoor | G06Q 30/0601 705/14.17 |
| 2014/0008433 A1 | 1/2014 | Hammad et al. | |
| 2014/0100973 A1 | 4/2014 | Brown et al. | |
| 2014/0244506 A1 | 8/2014 | Graming | |
| 2014/0244514 A1 | 8/2014 | Rodriguez et al. | |
| 2014/0279640 A1* | 9/2014 | Moreno | G06Q 50/265 705/325 |
| 2014/0330656 A1 | 11/2014 | Zhou et al. | |
| 2015/0006386 A1 | 1/2015 | Tebbe | |
| 2015/0026072 A1 | 1/2015 | Zhou et al. | |
| 2015/0161597 A1 | 6/2015 | Subramanian et al. | |
| 2015/0248664 A1 | 9/2015 | Makhdumi et al. | |
| 2016/0019536 A1* | 1/2016 | Ortiz | G06Q 20/36 705/67 |
| 2016/0307184 A1 | 10/2016 | Peyton et al. | |
| 2017/0046686 A1 | 2/2017 | Yoon et al. | |
| 2017/0124551 A1 | 5/2017 | Chitalia et al. | |
| 2017/0262824 A1* | 9/2017 | Singh | G06Q 20/381 |
| 2017/0308887 A1 | 10/2017 | Rolf | |
| 2018/0130037 A1* | 5/2018 | Dhulipalla | H04W 4/14 |
| 2018/0253541 A1 | 9/2018 | Finkenzeller et al. | |
| 2019/0122447 A1* | 4/2019 | Shah | G06Q 20/0855 |

FOREIGN PATENT DOCUMENTS

| | | |
|---|---|---|
| CN | 103679443 A | 3/2014 |
| CN | 103996114 A | 8/2014 |
| CN | 104252675 A | 12/2014 |
| CN | 106447321 A | 2/2017 |
| CN | 106651357 A | 5/2017 |
| CN | 107146077 A | 9/2017 |
| CN | 108171492 A | 6/2018 |
| JP | 2001-202429 A | 7/2001 |
| JP | 2002-024730 A | 1/2002 |
| JP | 2004-021311 A | 1/2004 |
| JP | 2014-010835 A | 1/2014 |
| KR | 10-2017-0023046 A | 3/2017 |
| KR | 10-2017-0089174 A | 8/2017 |
| KR | 10-2017-0136586 A | 12/2017 |
| TW | 201638848 A | 11/2016 |
| WO | 2009129568 A1 | 10/2009 |
| WO | 2013028901 A2 | 2/2013 |
| WO | 2015184353 A | 12/2015 |
| WO | 2016128257 A1 | 8/2016 |
| WO | 2017091846 A1 | 6/2017 |

\* cited by examiner

PAYMENT METHOD, APPARATUS AND DEVICE

CROSS-REFERENCE TO RELATED APPLICATIONS

This application is a continuation application of U.S. patent application Ser. No. 16/903,210, filed on Jun. 16, 2020, which is based on and claims priority to International Patent Application No. PCT/CN2019/070779, filed on Jan. 8, 2019. International Patent Application No. PCT/CN2019/070779 is based on and claims priority of the Chinese Patent Application No. 201810029073.1, filed on Jan. 12, 2018. All of the above-referenced applications are incorporated herein by reference in their entirety.

TECHNICAL FIELD

This application relates to the field of computer technologies, and in particular, to a payment method, apparatus, and device.

BACKGROUND

With the popularization of mobile payment, payment through code scanning is increasingly widely used.

In conventional technologies, a payment system may frequently cooperate with local third-party payment institutes to complete a payment. However, many third-party payment institutes (e.g., a foreign credit card company) cannot extract contents included in a digital object identifier (DOI) provided by a user due to incompatible system, and it is virtually impossible to modify existing infrastructures of the third-party payment institute to reconcile with the payment system. Thus, it is inconvenient or impossible for a user to complete a payment process in these scenarios.

In view of the limitations of conventional technologies, a more convenient payment solution is desired.

SUMMARY

Embodiments of this specification provide a payment method, apparatus, and device to resolve problems below, so as to provide a more convenient payment solution.

Based on this, this specification provides a payment method, including: determining a third-party payment institute; initiating, to a server, a request for acquiring a payment account, the payment account being related to the third-party payment institute, and the request including information about the third-party payment institute; and receiving a payment account returned by the server, the payment account being assigned to the server by the third-party payment institute.

In addition, this specification further provides a payment method, including: receiving a request for acquiring a payment account sent by a client, the payment account being related to a third-party payment institute, and the request including a user identity and information about the third-party payment institute; sending, to the third-party payment institute, the request for acquiring the payment account; receiving a payment account returned by the third-party payment institute; establishing a correspondence between the payment account and the user identity, and storing the correspondence; and sending the payment account to the client.

In addition, this specification further provides a payment method, including: acquiring a payment account, the payment account being related to a third-party payment institute; generating a digital object identifier (DOI) including payment account information; and presenting the DOI, for a merchant to perform scanning to acquire the payment account information.

In addition, this specification further provides a payment method, including: scanning a digital object identifier (DOI) including payment account information, a payment account being related to a third-party payment institute; acquiring the payment account information; and generating, to the third-party payment institute, a payment request including the payment account information and order information, for the third-party payment institute to identify the payment account and forward the payment request to a server.

In addition, this specification further provides a payment method, including: receiving a payment request including payment account information and order information and sent by a third-party payment institute, the payment account being related to the third-party payment institute; determining a corresponding user identity according to the payment account information; and performing payment processing on the order information according to the user identity.

In addition, this specification further provides a payment apparatus, including: a determining module configured to determine a third-party payment institute; a request initiating module configured to initiate, to a server, a request for acquiring a payment account, the payment account being related to the third-party payment institute, and the request including information about the third-party payment institute; and a receiving module configured to receive a payment account returned by the server, the payment account being assigned to the server by the third-party payment institute.

In addition, this specification further provides a second payment apparatus, including: a receiving module configured to receive a request for acquiring a payment account sent by a client, the payment account being related to a third-party payment institute, and the request including a user identity and information about the third-party payment institute; a sending module configured to send, to the third-party payment institute, the request for acquiring the payment account; the receiving module being further configured to receive a payment account returned by the third-party payment institute; and an establishing and storage module configured to establish a correspondence between the payment account and the user identity, and store the correspondence; the sending module being further configured to send the payment account to the client.

In addition, this specification further provides still another payment apparatus, including: an acquiring module configured to acquire a payment account, the payment account being related to a third-party payment institute; a generating module configured to generate a digital object identifier (DOI) including the payment account information; and a presenting module configured to present the DOI, for a merchant to perform scanning to acquire the payment account information.

In addition, this specification further provides a fourth payment apparatus, including: a scanning module configured to scan a digital object identifier (DOI) including payment account information, the payment account being related to a third-party payment institute; an acquiring module configured to acquire the payment account information; and a generating module configured to generate, to the third-party payment institute, a payment request including the payment account information and order information, for the third-party payment institute to identify the payment account and forward the payment request to a server.

In addition, this specification further provides a fifth payment apparatus, including: a receiving module configured to receive a payment request including payment account information and order information and sent by a third-party payment institute, the payment account being related to the third-party payment institute; a determining module configured to determine a corresponding user identity according to the payment account information; and a payment processing module configured to perform payment processing according to the user identity.

Correspondingly, this specification further provides a payment device, including: a memory configured to store a payment program; a processor configured to invoke the payment program in the memory and perform the following: determining a third-party payment institute; initiating, to a server, a request for acquiring a payment account, the payment account being related to the third-party payment institute, and the request including information about the third-party payment institute; and receiving a payment account returned by the server, the payment account being assigned to the server by the third-party payment institute.

Correspondingly, this specification further provides another payment device, including: a memory configured to store a payment program; a processor configured to invoke the payment program in the memory and perform the following: receiving a request for acquiring a payment account sent by a client, the payment account being related to a third-party payment institute, and the request including a user identity and information about the third-party payment institute; sending, to the third-party payment institute, the request for acquiring the payment account; receiving a payment account returned by the third-party payment institute; establishing a correspondence between the payment account and the user identity, and storing the correspondence; and sending the payment account to the client.

Correspondingly, this specification further provides still another payment device, including: a memory configured to store a payment program; a processor configured to invoke the payment program in the memory and perform the following: acquiring a payment account, the payment account being related to a third-party payment institute; generating a digital object identifier (DOI) including payment account information; and presenting the DOI, for a merchant to perform scanning to acquire the payment account information.

Correspondingly, this specification further provides a fourth payment device, including: a memory configured to store a payment program; a processor configured to invoke the payment program in the memory and perform the following: scanning a digital object identifier (DOI) including payment account information, a payment account being related to a third-party payment institute; acquiring the payment account information; and generating, for the third-party payment institute, a payment request including the payment account information and order information, for the third-party payment institute to identify the payment account and forward the payment request to a server.

Correspondingly, this specification further provides a fifth payment device, including: a memory configured to store a payment program; a processor configured to invoke the payment program in the memory and perform the following: receiving a payment request including payment account information and order information and sent by a third-party payment institute, the payment account being related to the third-party payment institute; determining a corresponding user identity according to the payment account information; and performing payment processing according to the user identity.

Correspondingly, this specification further provides a non-transitory computer storage medium storing computer-executable instructions, the computer-executable instructions being executable to perform the following: determining a third-party payment institute; initiating, to a server, a request for acquiring a payment account, the payment account being related to the third-party payment institute, and the request including information about the third-party payment institute; and receiving a payment account returned by the server, the payment account being assigned to the server by the third-party payment institute.

Correspondingly, this specification further provides another non-transitory computer storage medium storing computer-executable instructions, the computer-executable instructions being executable to perform the following: receiving a request for acquiring a payment account sent by a client, the payment account being related to a third-party payment institute, and the request including a user identity and information about the third-party payment institute; sending, to the third-party payment institute, the request for acquiring the payment account; receiving a payment account returned by the third-party payment institute; establishing a correspondence between the payment account and the user identity, and storing the correspondence; and sending the payment account to the client.

Correspondingly, this specification further provides still another non-transitory computer storage medium storing a computer-executable instructions, the computer-executable instructions being executable to perform the following: acquiring a payment account, the payment account being related to a third-party payment institute; generating a digital object identifier (DOI) including payment account information; and presenting the DOI, for a merchant to perform scanning to acquire the payment account information.

Correspondingly, this specification further provides a fourth non-transitory computer storage medium storing computer-executable instructions, the computer-executable instructions being executable to perform the following: scanning a digital object identifier (DOI) including payment account information, a payment account being related to a third-party payment institute; acquiring the payment account information; and generating, to the third-party payment institute, a payment request including the payment account information and order information, for the third-party payment institute to identify the payment account and forward the payment request to a server.

Correspondingly, this specification further provides a fifth non-transitory computer storage medium storing computer-executable instructions, the computer-executable instructions being executable to perform the following: receiving a payment request including payment account information and order information and sent by a third-party payment institute, the payment account being related to the third-party payment institute; determining a corresponding user identity according to the payment account information; and performing payment processing according to the user identity.

Additionally, this specification further provides a payment method. The method may include: receiving, by a server, from a client terminal, a request for acquiring a payment account for a transaction, the payment account being associated with a third-party payment institute, and the request including identity information of a user and information about the third-party payment institute; sending, by the server, to the third-party payment institute, the request for acquiring the payment account; receiving, by the server, from the third-party payment institute, a payment account; establishing, by the server, a correspondence between the payment account and the identity information of the user, and storing the correspondence; and sending, by the server, to the client terminal, the payment account to cause the client terminal to generate a digital object identifier (DOI) including information of the payment account. The DOI may be a 2-dimensional (2-D) quick response code (QR code), and the information of the payment account in the DOI may be extractable by a merchant by scanning the DOI using a scanning device to complete the transaction.

Additionally, this specification further provides a payment apparatus. The payment apparatus may include a processor and a non-transitory computer-readable memory coupled to the processor and configured with instructions executable by the processor to: receive, from a client terminal, a request for acquiring a payment account for a transaction, the payment account being associated with a third-party payment institute, and the request including identity information of a user and information about the third-party payment institute; send, to the third-party payment institute, the request for acquiring the payment account; receive, from the third-party payment institute, a payment account; establish a correspondence between the payment account and the identity information of the user, and store the correspondence; and send the payment account to a client terminal to cause the client terminal to generate a digital object identifier (DOI) including information of the payment account. The DOI may be a 2-dimensional (2-D) quick response code (QR code), and the information of the payment account in the DOI may be extractable by a merchant by scanning the DOI using a scanning device to complete the transaction.

Additionally, this specification further provides a non-transitory computer-readable storage medium. The medium may have instructions stored thereon executable by a processor to cause the processor to perform operations, including: receiving, from a client terminal, a request for acquiring a payment account for a transaction, the payment account being associated with a third-party payment institute, and the request including identity information of a user and information about the third-party payment institute; sending, to the third-party payment institute, the request for acquiring the payment account; receiving, from the third-party payment institute, a payment account; establishing a correspondence between the payment account and the identity information of the user, and storing the correspondence; and sending, to the client terminal, the payment account to cause the client terminal to generate a digital object identifier (DOI) including information of the payment account. The DOI may be a 2-dimensional (2-D) quick response code (QR code), and the information of the payment account in the DOI may be extractable by a merchant by scanning the DOI using a scanning device to complete the transaction.

At least one of the foregoing technical solutions adopted in some embodiments of this description can achieve the following beneficial effects.

A user may determine, according to geographical location information of the user, a third-party payment institute corresponding to a local place, then obtain a payment account provided by the third-party payment institute usable in local transactions through a payment server. Through barcode scanning, the payment account of the third-party payment institute may be used to completed a transaction. During the payment process, a DOI including information of the payment account may be presented to a merchant, and the merchant may extract the payment account therein and forward order information and the payment account to the third-party payment institute. The third-party payment institute may identify the payment account and, upon a successful identification, forward the same to the payment server. The payment server may identify a user identity corresponding to the payment account, and perform payment process. Therefore, user information may be combined with card information identifiable by an existing third-party payment institute in other countries and regions. Thus convenient payment-through-scanning scheme may be implemented in foreign countries and regions, thereby improving user experience.

DETAIL DESCRIPTION OF SOME EMBODIMENTS

To make the objectives, technical solutions, and advantages of this specification clearer, the following clearly and completely describes the technical solutions of this specification with reference to specific embodiments of this specification and accompanying drawings. Apparently, the described embodiments are only some embodiments rather than all embodiments of this specification. All other embodiments obtained by a person of ordinary skill in the art based on the embodiments in this specification without creative effects shall fall within the protection scope of this specification.

Currently, it is very common in the payment field to make a payment using a digital object identifier (DOI) that includes user information, such as various payment barcodes and 2-dimensional (2D) payment QR codes. The QR code may also be referred to as "quick response code" and has a plurality of standards, such as Code 16K, Code 49, PDF417, and MicroPDF417.

However, in some regions (such as most foreign regions), local third-party payment institutes usually cannot extract the information in a QR code. In other words, even if a merchant scans and parses the QR code by using a code scanning device and obtains contents in the QR code, a third-party payment institute (e.g., a credit card payment institute) cannot extract the information in the contents, and thus unable to process the payment. That causes inconvenience for persons who temporarily travel aboard for a short period of time (e.g., persons travel for vacations, academic visits, and transit).

In view of this limitation, this specification provides a payment solution. In the payment solution of this specification, user information may be combined with card information identifiable by an existing third-party payment institute in foreign countries and regions, so that convenient payment-through-scanning scheme may be implemented.

In some embodiments of this specification, the payment solution provided herein may include two parts. The first part is a process in which a user obtains a payment account associated with a third-party payment institute, and the second part is a process in which the user makes a payment using the payment account. These two parts do not necessarily need to be completely separated. In some scenarios, the two parts may also be jointly implemented to complete a payment.

Figure 1:
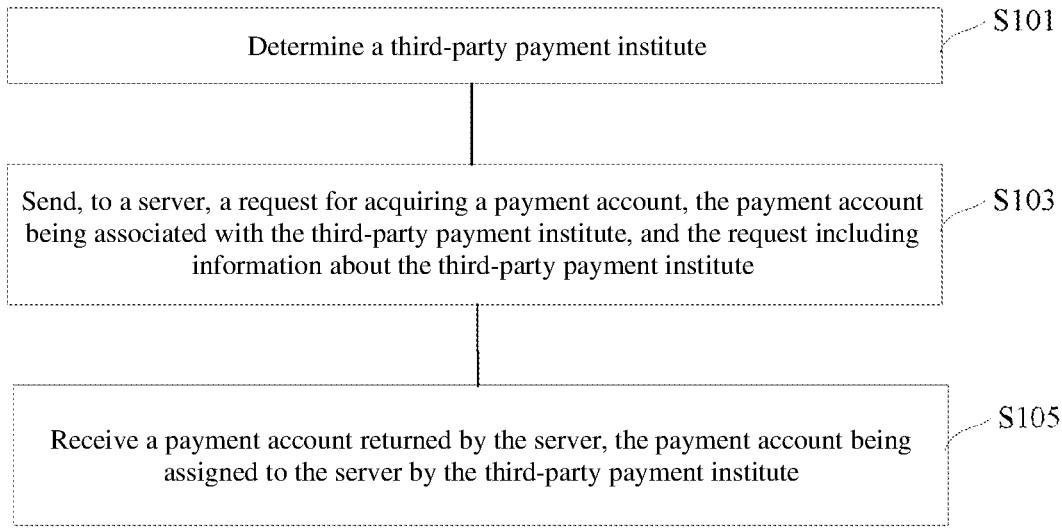
FIG. 1 is a process of acquiring a payment account of a third-party payment institute by a client, according to an embodiment of this specification.

The first part of the payment solution provided according to an embodiment of this specification is described in details below. This part may include a client aspect and a server aspect. The client aspect is shown in FIG. 1. FIG. 1 is a process of acquiring a payment account of a third-party payment institute by a client, according to an embodiment of this specification. In this specification, the term "client" may refer to a hardware device used by a user (i.e., a client terminal).

Referring to FIG. 1, the process may include the following steps.

In step S101, a third-party payment institute may be determined.

In some embodiments, the third-party payment institute may be explicitly determined. That is, the client may directly provide several third-party payment institutes to a user for selection. In some embodiments, the third-party payment institute may be implicitly determined. That is, the determination may be automatically performed in the background. The third-party payment institute herein may include an order collection institute, a payment platform, and a bank associated with the payment platform, etc.

In step S103, a request for acquiring a payment account may be sent to the server. The payment account may be associated with the third-party payment institute, and the request may include information about the third-party payment institute.

The payment account herein may be used for a transaction and may usually be a card number, which may also be referred to as a primary account number (PAN). The PAN may belong to the third-party payment institute itself. For example, the third-party payment institute itself may be a bank, and is capable of performing payment service through bank cards. The PAN may also be assigned by a partner of the third-party payment institute. For example, the third-party payment institute may include an order collection institute receiving orders, and forwarding, according to card numbers, the orders to corresponding banks for payment processing. That is, the PAN may be issued by a bank in the third-party payment institute. In addition, since the PAN issuer (i.e., the bank) may have a business relationship with the payment system, the payment account (i.e., the PAN) may be recognized to be corresponding to the payment system. Specific implementations may be determined based on business types of the third-party institution, and is not limited herein. When a request is sent, a user identity (i.e., identification information of a user) should be included in the request for the server to identify a corresponding account.

In step S105, a payment account returned by the server may be received. The payment account may be assigned to the server by the third-party payment institute.

Generally, the server by itself has no authority to assign the payment account of the third-party payment institute. The server may need to submit a corresponding application to the third-party payment institute according to the request. After receiving the payment account assigned by the third-party payment institute, the server may return the payment account to the client. In some embodiments, the server may have been previously assigned, through the third-party payment institute, a batch of payment accounts, which may be stored in the server, and the server may directly assign a locally stored payment account to the client.

In some embodiments, in step S101, the determining a third-party payment institute may include: acquiring a geographical location of the user; determining a payment institute related to the geographical location of the user; and designating the payment institute related to the geographical location of the user as the third-party payment institute.

In particular, a client may pre-store corresponding information of the third-party payment institutes and the geographical locations on a local terminal. After the user arrives at a specific geographical location, a third-party payment institute corresponding to this geographical location may be determined accordingly, and a corresponding application may be submitted to third-party payment institute by the server. In this process, the client may determine a user location by acquiring the location of the client in real time without requiring an input from the user. The entire location determination and application process may not be perceptible by the user, which improves user experience.

In some embodiments, in step S101, the determining a third-party payment institute may further include: receiving a user instruction, and determining the third-party payment institute according to the user instruction.

In other words, the client may explicitly provide a list of available third-party payment institutes to the user for selection. For example, a list of several countries, such as USA, Japan, Malaysia, may first be provided to the user for selection. After a specific country is selected, available third-party payment institutes (e.g., A, B, or C) in that country may be further provided to the user for selection. This process may be performed by the user in advance instead of at the time of payment. For example, if the user plans to travel to the United States in one week, the user may determine a corresponding third-party payment institute in the United States before arriving the United States and send a payment account application to a server for future payment.

In some embodiments, after the client acquires a payment account through the foregoing process, the method may further include: storing the payment account locally.

In particularly, a payment account request from a server may be a request made at the time of a payment, and the payment account may be obtained from a third-party payment institute to complete a one-time payment. For convenience in future payments, the client may store the payment account for making future payments through the third-party payment institute.

Figure 2:
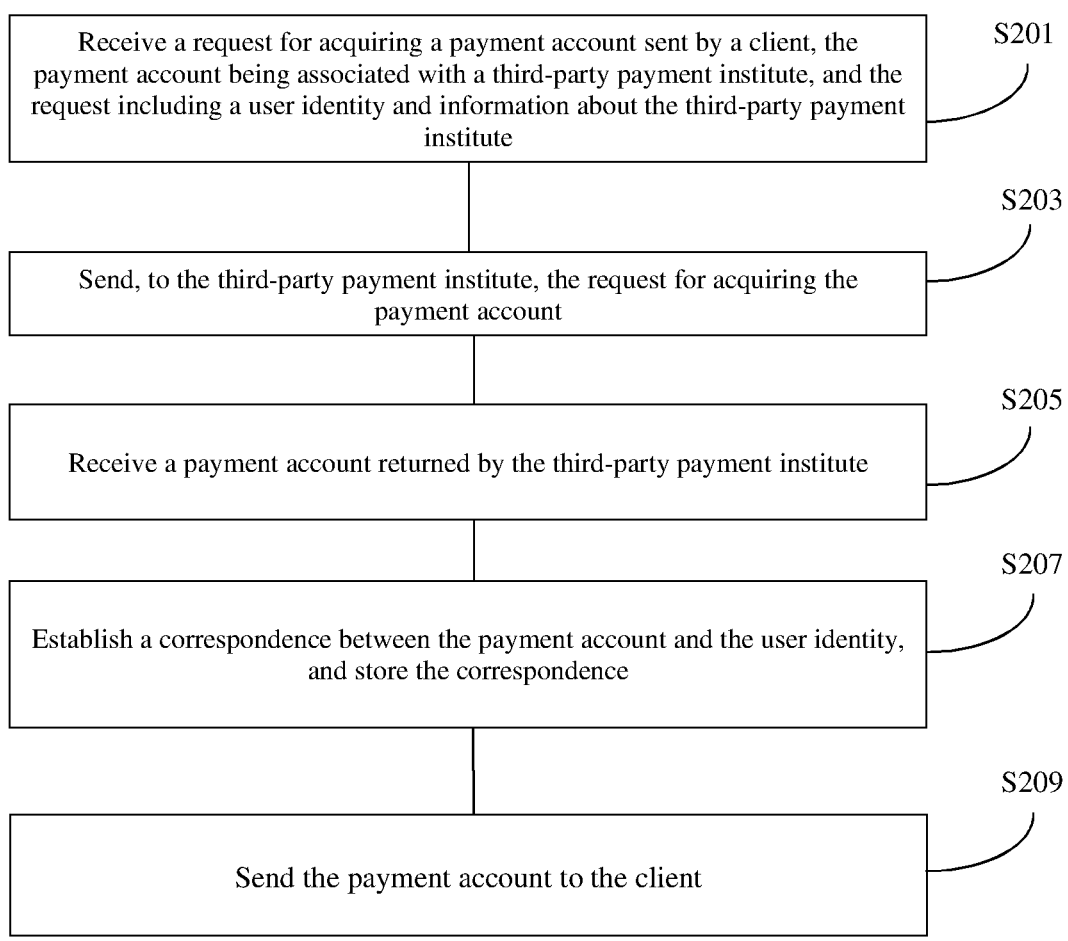
FIG. 2 is a process of acquiring a payment account of a third-party payment institute by a server, according to an embodiment of this specification.

FIG. 2 is a process of acquiring a payment account of a third-party payment institute by a server, according to an embodiment of this specification.

Referring to FIG. 2, in step S201, a request for acquiring a payment account sent by a client may be received. The payment account may be associated with a third-party payment institute, and the request may include a user identity and information about the third-party payment institute.

In step S203, the request for acquiring the payment account may be sent to the third-party payment institute.

In step S205, a payment account returned by the third-party payment institute may be received.

In step S207, a correspondence between the payment account and the user identity may be established, and stored.

In step S209, the payment account may be sent to the client.

Figure 3:
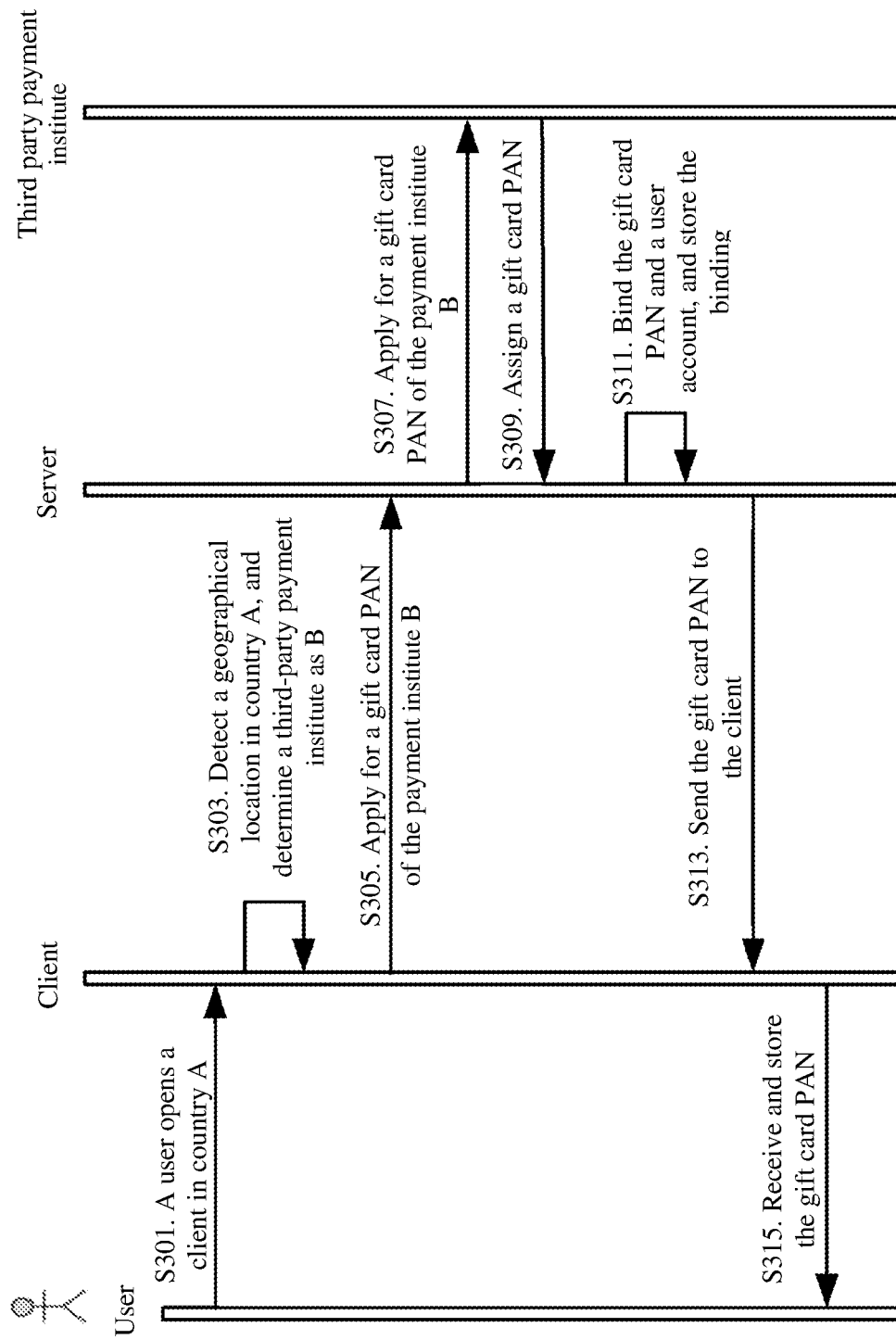
FIG. 3 is a schematic diagram of a process of acquiring a payment account associated with a third-party payment institute by a user, according to an embodiment of this specification.

Specific steps of this process are shown in FIG. 3. FIG. 3 is a schematic diagram of a process of acquiring a payment account related to a third-party payment institute by a user, according to an embodiment of this specification. In the schematic diagram, a gift card PAN provided by a third-party payment institute B in a country A is used as an example. Referring to FIG. 3, the process may include the following steps.

In step S301, a user may open a client in country A.

In step S303, the client may detect that a geographical location of the user is country A, and determine that a corresponding third-party payment institute is payment institute B.

In step S305, the client may apply to a server for a gift card PAN of the payment institute B.

In step S307, the server may apply for one gift card PAN to the payment institute B.

In step S309, the payment institute B may assign one gift card PAN to the server.

In step S311, the server may bind the gift card PAN with a user account and store the binding on the server.

In step S313, the server may send the gift card PAN to the client.

In step S315, the client may receive and store the gift card PAN.

It should be noted that in the foregoing example, the third-party payment institute is determined based on the geographic location of the user by the client. In actual applications, this determination may also be conducted by the server, details implementation of which will be described below.

First, the client may determine a geographical location of the client, and send, to the server, a request for applying for a third-party payment account with the geographical location. Then, the server may determine a corresponding third-party payment institute according to the geographical location, and then apply for a payment account to the third-party payment institute. Upon an approval of the application for the payment account, the server may bind a user identity to the obtained payment account and forward the payment account to the client.

Figure 4:
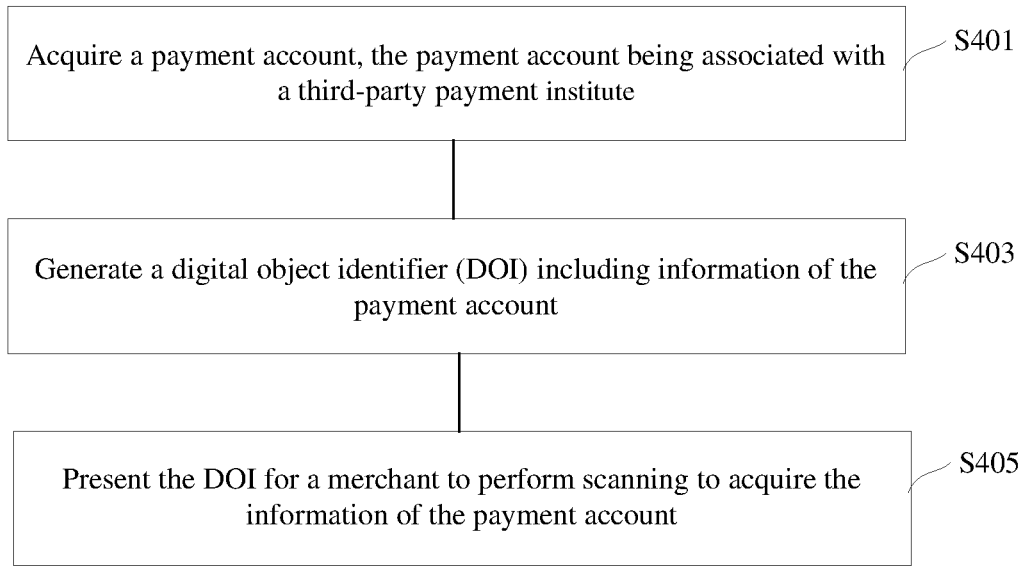
FIG. 4 is a schematic flowchart of a payment process for a client, according to an embodiment of this specification.

A payment process the user may make using the payment account may include three aspects: a user client aspect, a merchant aspect, and a server aspect. The user client aspect of the payment process is shown in FIG. 4. FIG. 4 is a schematic flowchart of a payment process for a client, according to an embodiment of this specification.

Referring to FIG. 4, the payment process may include the following steps.

In step S401, a payment account may be acquired. The payment account may be associated with a third-party payment institute.

The payment account associated with the third-party payment institute may be acquired from a local terminal, or may be obtained by sending an on-the-spot application to the server. The payment account obtained from the local terminal is generally obtained by the user in advance through an application based on the geographical location.

In step S403, a digital object identifier (DOI) including the information of the payment account may be generated.

In this step, the information of the payment account may be expressed in an extensible markup language (xml) format or other formats, and then a character string of the xml format or other formats may be converted to the DOI.

In step S405, the DOI may be presented to a merchant for the merchant to perform scanning to acquire the information of the payment account.

As previously described, in some embodiments, in step S401, the payment account may be acquired by sending an on-the-spot application to the server according to a geographical location of the user. More specifically, this step may include: acquiring a geographical location of a user; determining a third-party payment institute related to the geographical location of the user; submitting, to the server, a request for acquiring a payment account, for the server to send, to the third-party payment institute, a request for the payment account; and receiving a payment account returned by the server and assigned by the third-party payment institute.

Figure 5:
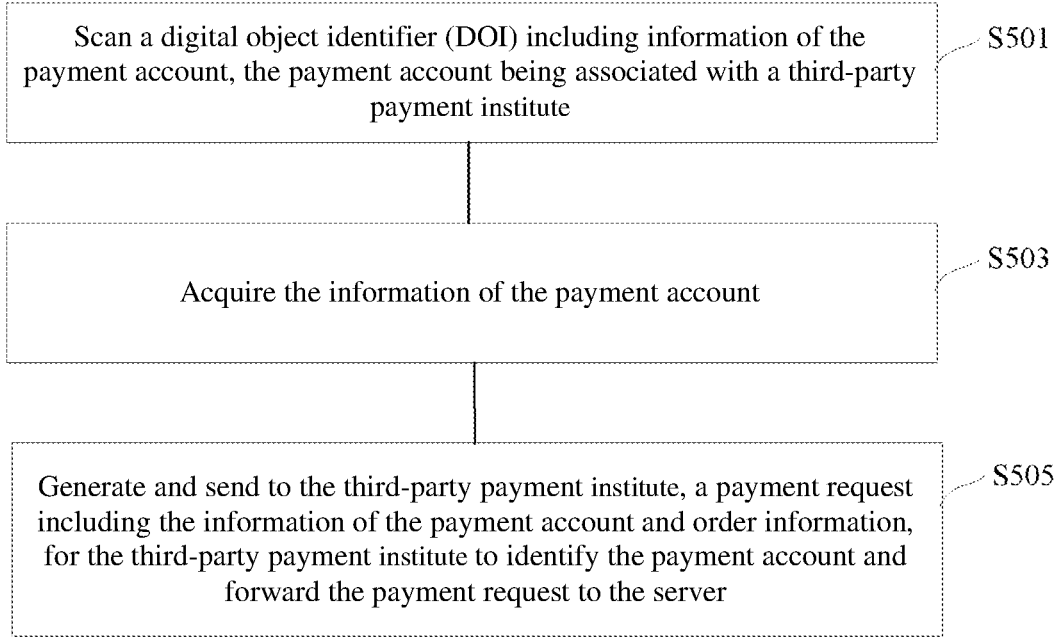
FIG. 5 is a schematic flowchart of a payment process for a merchant, according to an embodiment of this specification.

The merchant aspect of the payment process is shown in FIG. 5. FIG. 5 is a schematic flowchart of a payment process for a merchant, according to an embodiment of this specification. The process may include the following steps. In this specification, the term "merchant" may more specifically mean a computer device (i.e., a merchant terminal) that is used to complete a transaction.

In step S501, a digital object identifier (DOI) including information of the payment account may be scanned. The payment account may be associated with a third-party payment institute.

In step S503, the information of the payment account may be acquired.

In step S505, a payment request including the information of the payment account and order information may be generated and sent to the third-party payment institute, for the third-party payment institute to identify the payment account and forward the payment request to the server.

In particular, the merchant may acquire contents in DOI through a scanning device, but the third-party payment institute may only identify the information of the payment account in the DOI (since only the information of the payment account is associated with the third-party payment institute). Therefore, during a payment process, after identifying the payment account, the third-party payment institute may forward the payment request to the server to process the payment. The order information may include specific information such as an ID of the merchant, an order amount, an order time, and an order number, etc.

It should be noted that, before forwarding of the payment request to the server by the third-party payment institute, some other processes related to the third-party payment institute may be further included. For example, the payment account may be sent to a corresponding opening bank for identification and verification. Upon a successful identification and verification, the opening bank may forward the payment request to the server for payment. Specific details may be closely related to system infrastructure of the third-party payment institute, and are not extensively listed herein for the sake of conciseness. Eventually, the third-party payment institute may identify that the payment account is related to the server, and forward the payment account and order information to the server.

Figure 6:
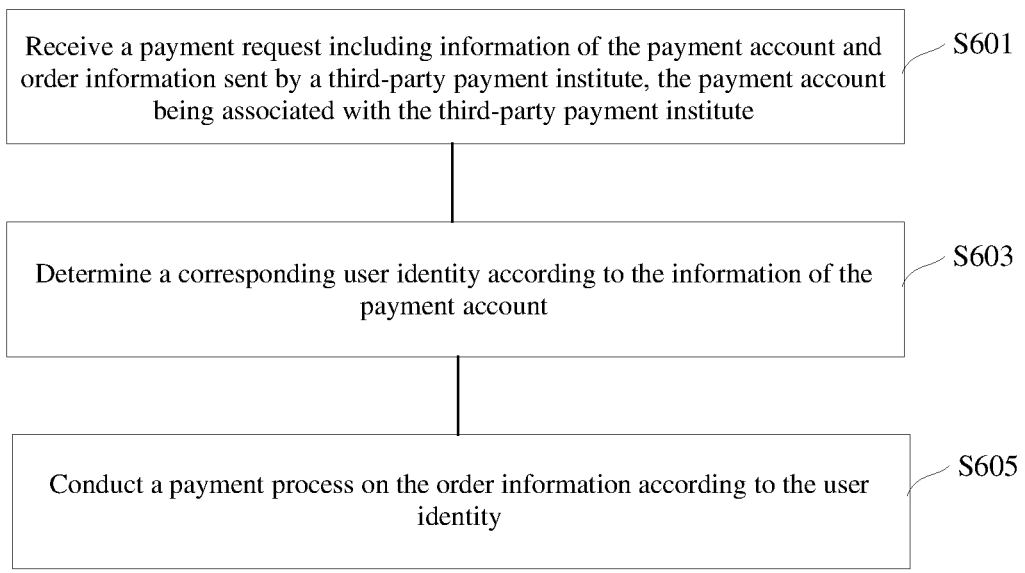
FIG. 6 is a schematic flowchart of a payment process for a server, according to an embodiment of this specification.

The server aspect of the payment process is shown in FIG. 6. FIG. 6 is a schematic flowchart of a payment process for a server, according to an embodiment of this specification. The process may include the following steps.

In step S601, a payment request including information of the payment account and order information sent by a third-party payment institute may be received. The payment account may be associated with the third-party payment institute.

In step S603, a corresponding user identity may be determined according to the information of the payment account.

In step S605, a payment process may be conducted on the order information according to the user identity.

Figure 7:
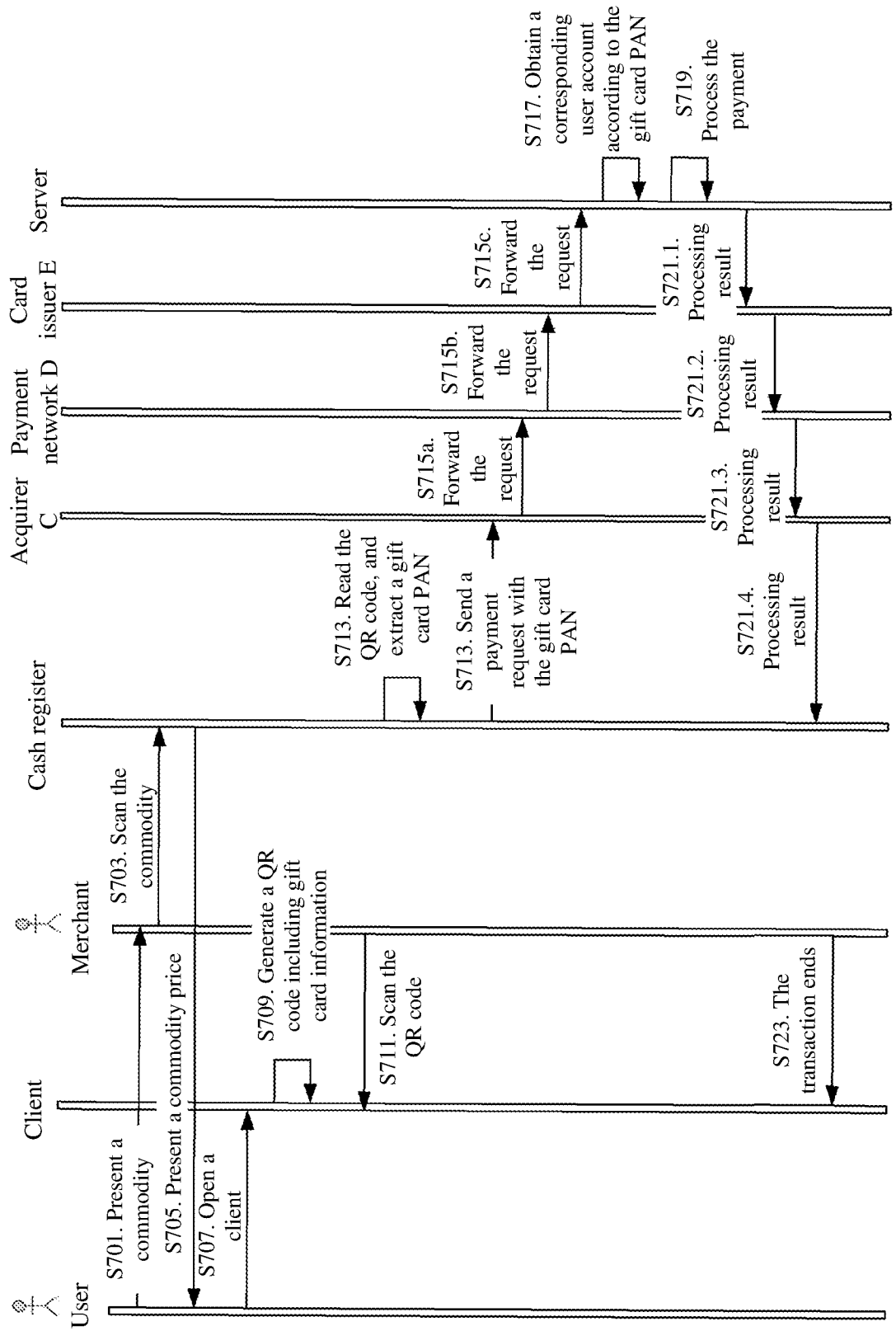
FIG. 7 is a schematic diagram of a payment process using a payment account of a third-party payment institute, according to an embodiment of this specification.

The payment process generally refers to a transfer of monetary balance from an account corresponding to the user identity to an account of a merchant. After the payment process is completed, it is usually necessary to send a notification message to the third-party payment institute, which may forward the notification message to the merchant. An example that includes an order collection institute C, a gift card payment platform D, and an opening bank E will be used to describe the foregoing payment process. In this example, a third-party payment institute may include the order collection institute C, the gift card payment platform D, and the opening bank E, as shown in FIG. 7. FIG. 7 is a schematic diagram of a payment process using a payment account of a third-party payment institute, according to an embodiment of this specification. The process may include the following steps.

In step S701, a user may present a to-be-purchased commodity to a merchant.

In step S703, a cashier may scan the commodity.

In step S705, the cashier may present a price of the commodity to the user.

In step S707, the user may open a client.

In step S709, the client may generate a QR code including gift card information.

In step S711, the cashier may scan the QR code.

In step S713, the cash register may read the QR code and extract a gift card PAN in the QR code.

In step S715, the cash register may send order information and the gift card PAN to an order collection institute C. The order collection institute C may determine that it is a gift card, and forward the request to a payment platform D. The payment platform D may contact a card issuer E. The card issuer E may determine that the card belongs to the server and forward the request to the server.

In step S717, the server may obtain a corresponding user account according to the gift card PAN.

In step S719, the server may process the payment.

In step S721, the server may return a result to a third-party payment institute, and eventually to the cash register of the merchant.

In step S723, the transaction may complete.

Figure 8:
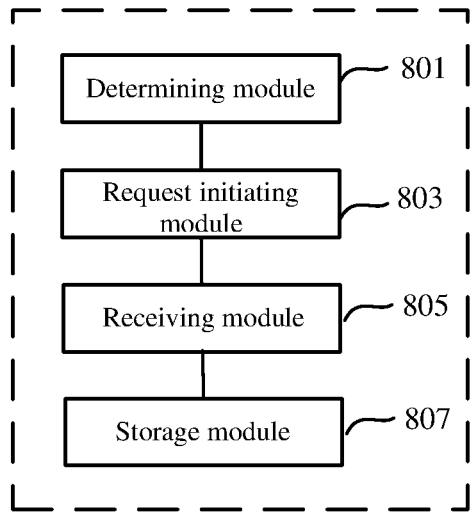
FIG. 8 is a schematic diagram of a payment apparatus, according to an embodiment of this specification.

Based on a same idea, this specification further provides a payment apparatus as shown in FIG. 8. FIG. 8 is a schematic diagram of a payment apparatus, according to an embodiment of this specification. The apparatus may include a determining module 801, a request initiating module 803, and a receiving module 805.

The determining module 801 may be configured to determine a third-party payment institute.

The request initiating module 803 may be configured to send, to a server, a request for acquiring a payment account. The payment account may be associated with the third-party payment institute, and the request may include information about the third-party payment institute.

The receiving module 805 may be configured to receive a payment account returned by the server. The payment account may be assigned to the server by the third-party payment institute.

Further, the determining module 801 may be configured to acquire a geographical location of a user; determine a payment institute related to the geographical location of the user; and designate a payment institute related to the geographical location of the user as the third-party payment institute.

Further, the determining module 801 may be configured to receive a user instruction, and determine the third-party payment institute according to the user instruction.

Further, the apparatus may further include a storage module 807 configured to store the payment account locally.

Figure 9:
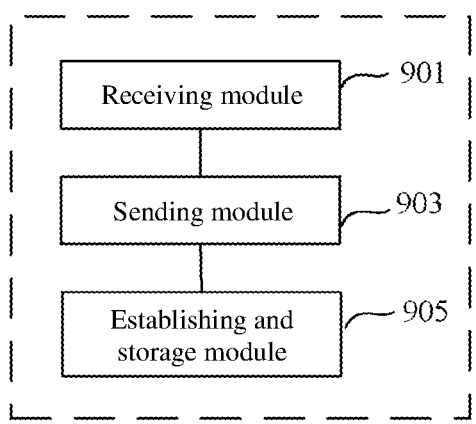
FIG. 9 is a schematic diagram of a second payment apparatus, according to an embodiment of this specification.

In addition, this specification further provides a second payment apparatus as shown in FIG. 9. FIG. 9 is a schematic diagram of the second payment apparatus, according to an embodiment of this specification. The apparatus may include a receiving module 901, a sending module 903, and a establishing and storage module 905.

The receiving module 901 may be configured to receive a request for acquiring a payment account sent by a client. The payment account may be associated with a third-party payment institute, and the request may include a user identity and information about the third-party payment institute.

The receiving module 901 may be further configured to receive a payment account returned by the third-party payment institute.

The sending module 903 may be configured to send, to the third-party payment institute, the request for acquiring the payment account.

The establishing and storage module 905 may be configured to establish a correspondence between the payment account and the user identity, and store the correspondence.

The sending module 903 may be further configured to send the payment account to the client.

Figure 10:
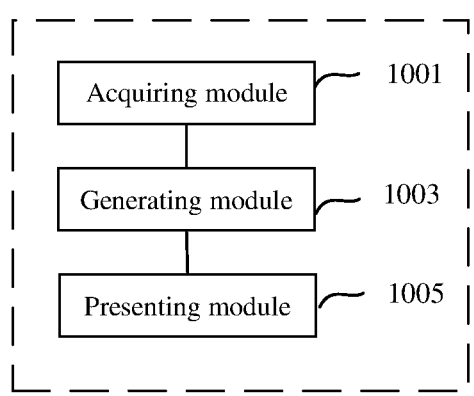
FIG. 10 is a schematic diagram of a third payment apparatus, according to an embodiment of this specification.

This specification further provides a third payment apparatus as shown in FIG. 10. FIG. 10 is a schematic diagram of the third payment apparatus, according to an embodiment of this specification. The apparatus may include an acquiring module 1001, a generating module 1002, and a presenting module 1003.

The acquiring module 1001 may be configured to acquire a payment account. The payment account may be associated with a third-party payment institute.

The generating module 1002 may be configured to generate a digital object identifier (DOI) including the information of the payment account.

The presenting module 1003 may be configured to present the DOI, for a merchant to perform code scanning to acquire the information of the payment account.

Further, the acquiring module 1001 may be configured to acquire a geographical location of a user; determine a third party payment institute related to the geographical location of the user; send a request for acquiring the payment account to the server, for the server to send, to the third-party payment institute, a request for the payment account; and receive a payment account returned by the server and assigned by the third-party payment institute.

Further, the acquiring module 1001 may be configured to acquire a payment account pre-stored locally and associated with the third-party payment institute.

Figure 11:
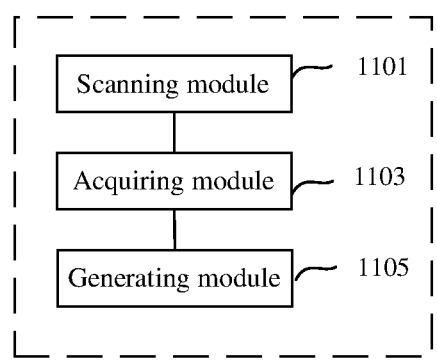
FIG. 11 is a schematic diagram of a fourth payment apparatus, according to an embodiment of this specification.

Additionally, this specification further provides a fourth payment apparatus as shown in FIG. 11. FIG. 11 is a schematic diagram of the fourth payment apparatus, according to an embodiment of this specification. The apparatus may include a scanning module 1101, an acquiring module 1103, and a generating module 1105.

The scanning module 1101 may be configured to scan a digital object identifier (DOI) including information of a payment account. The payment account may be associated with a third-party payment institute.

The acquiring module 1103 may be configured to acquire the payment account information.

The generating module 1105 may be configured to generate a payment request including the information of the payment account and order information and send the payment request to the third-party payment institute, for the third-party payment institute to identify the payment account and forward the payment request to the server.

Figure 12:
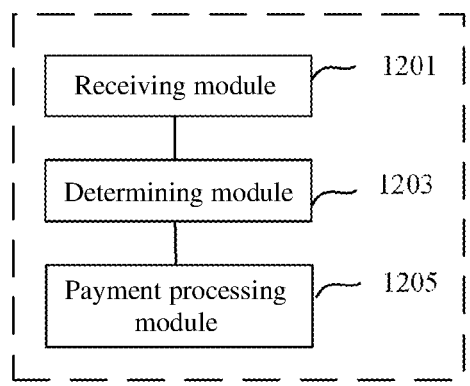
FIG. 12 is a schematic diagram of a fifth payment apparatus, according to an embodiment of this specification.

Additionally, this specification further provides a fifth payment apparatus as shown in FIG. 12. FIG. 12 is a schematic diagram of the fifth payment apparatus, according to an embodiment of this specification. The apparatus may include a receiving module 1201, a determining module 1203, and a payment processing module 1205.

The receiving module 1201 may be configured to receive a payment request including information of a payment account and order information sent by a third-party payment institute. The payment account may be associated with the third-party payment institute.

The determining module 1203 may be configured to determine a corresponding user identity according to the information of the payment account.

The payment processing module 1205 may be configured to perform payment process according to the user identity.

Correspondingly, this specification further provides a payment device. The device may include a memory configured to store a payment program; and a processor configured to invoke the payment program in the memory and perform operations. The operations may include: determining a third-party payment institute; sending, to a server, a request for acquiring a payment account, the payment account being associated with a third-party payment institute, and the request including information about the third-party payment institute; and receiving a payment account returned by the server, the payment account being assigned to the server by the third-party payment institute.

Correspondingly, this specification further provides a second payment device. The second payment device may include: a memory configured to store a payment program; and a processor configured to invoke the payment program in the memory and perform operations. The operations may include: receiving a request for acquiring a payment account sent by a client, the payment account being associated with a third-party payment institute, and the request including a user identity and information about the third-party payment institute; sending, to the third-party payment institute, the request for acquiring the payment account; receiving a payment account returned by the third-party payment institute; establishing a correspondence between the payment account and the user identity, and storing the correspondence; and sending the payment account to the client.

Correspondingly, this specification further provides a third payment device. The third payment device may include: a memory configured to store a payment program; and a processor configured to invoke the payment program in the memory and perform operations. The operations may include: acquiring a payment account, the payment account being associated with a third-party payment institute; generating a digital object identifier (DOI) including information of a payment account; and presenting the DOI, for a merchant to perform code scanning to acquire the information of the payment account.

Correspondingly, this specification further provides a fourth payment device. The fourth payment device may include: a memory configured to store a payment program; and a processor configured to invoke the payment program in the memory and perform operations. The operations may include scanning a digital object identifier (DOI) including information of a payment account, the payment account being associated with a third-party payment institute; acquiring the information of the payment account; and generating a payment request including the information of the payment account and order information, and sending the payment request to the third-party payment institute for the third-party payment institute to identify the payment account and forward the payment request to a server.

Correspondingly, this specification further provides a fifth payment device. The device may include: a memory configured to store a payment program; and a processor configured to invoke the payment program in the memory and perform operations. The operations may include: receiving a payment request including information of a payment account and order information sent by a third-party payment institute, the payment account being associated with the third-party payment institute; determining a corresponding user identity according to the information of the payment account; and performing payment process according to the user identity.

Correspondingly, this specification further provides a non-transitory computer storage medium storing computer-executable instructions. The computer-executable instructions may be executed by a processor to perform operations. The operations may include: determining a third-party payment institute; sending, to a server, a request for acquiring a payment account, the payment account being associated with the third-party payment institute, and the request including information about the third-party payment institute; and receiving a payment account returned by the server, the payment account being assigned to the server by the third-party payment institute.

Correspondingly, this specification further provides a second non-transitory computer storage medium storing computer-executable instructions. The computer-executable instructions may be executed by a processor to perform operations. The operations may include: receiving a request for acquiring a payment account sent by a client, the payment account being associated with a third-party payment institute, and the request including a user identity and information about the third-party payment institute; sending, to the third-party payment institute, the request for acquiring the payment account; receiving a payment account returned by the third-party payment institute; establishing a correspondence between the payment account and the user identity, and storing the correspondence; and sending the payment account to the client.

Correspondingly, this specification further provides a third non-transitory computer storage medium storing computer-executable instructions. The computer-executable instructions may be executed by a processor to perform operations. The operations may include: acquiring a payment account, the payment account being associated with a third-party payment institute; generating a digital object identifier (DOI) including information of a payment account; and presenting the DOI, for a merchant to perform code scanning to acquire the information of the payment account.

Correspondingly, this specification further provides a fourth non-transitory computer storage medium storing computer-executable instructions. The computer-executable instructions may be executed by a processor to perform operations. The operations may include: scanning a digital object identifier (DOI) including information of a payment account, the payment account being associated with a third-party payment institute; acquiring the information of the payment account; and generating a payment request including the information of the payment account and order information, and sending the payment request to the third-party payment institute, for the third-party payment institute to identify the payment account and forward the payment request to a server.

Correspondingly, this specification further provides a fifth non-transitory computer storage medium storing computer-executable instructions. The computer-executable instructions may be executed by a processor to perform operations. The operations may include: receiving a payment request including information of a payment account and order information sent by a third-party payment institute, the payment account being associated with the third-party payment institute; determining a corresponding user identity according to the information of the payment account; and performing payment process according to the user identity.

Embodiments in this specification are all described in a progressive manner, and relevant parts in preceding embodiments may be referred to for same or similar parts in some embodiments. Descriptions of each embodiment focus on a difference from other embodiments. Apparatus, device, and medium embodiments are generally similar to corresponding method embodiments, and therefore are described briefly. Relevant parts in the method embodiments may be referred to for related parts in apparatus, device, and medium embodiments, details of which are not repeatedly described herein for the sake of conciseness.

This concludes the description of the embodiments of this specification. Other embodiments may fall within the scope of the appended claims. In some embodiments, the actions, steps, or modules recorded in the claims may be performed in sequences different from those in some embodiments and an expected result may still be achieved. In addition, the processes depicted in the accompanying drawings do not necessarily require specific sequences or consecutive sequences to achieve an expected result. In some implementations, multitasking and parallel processing may be feasible or beneficial.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers generally may program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user through programming the device. The designers may perform voluntary programming to integrate a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced boolean expression language (ABEL), altera hardware description language (AHDL), Confluence, Cornell University programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, during implementation of some embodiments of this specification, the function of the units may be implemented in a same piece of or multiple pieces of software and/or hardware.

A person skilled in the art should understand that some embodiments of this specification may be provided as a method, a system, or a computer program product. Therefore, this specification may use a form of hardware only embodiments, software only embodiments, or embodiments with a combination of software and hardware. Moreover, this specification may use a form of a computer program product that is implemented on one or more computer-usable storage media (including but not limited to a disk memory, a CD-ROM, an optical memory, and the like) that include computer-usable program code.

This specification is described with reference to the flowchart and/or block diagram of the method, device (system), and computer program product of some embodiments of this specification. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include a form such as a persistent memory, a random-access memory (RAM) and/or a non-transitory memory of computer readable media, for example, a read-only memory (ROM) or a flash memory (RAM). The memory is an example of the computer readable medium.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in this disclosure, the computer-readable medium does not include transitory computer readable media (transitory media), such as a modulated data signal and a carrier.

It should also be noted that the terms "include," "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

Some embodiments of this specification can be described in the general context of computer-executable instructions executed by a computer, for example, a program module. Generally, the program module includes a routine, a program, an object, a component, a data structure, and the like for executing a particular task or implementing a particular abstract data type. Some embodiments of this specification may also be practiced in distributed computing environments in which tasks are performed by remote processing devices that are connected by using a communications network. In a distributed computing environment, the program module may be located in both local and remote computer storage media including storage devices.

Some embodiments in this specification are all described in a progressive manner, for same or similar parts in some embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments in this specification and are not intended to limit this specification. For a person skilled in the art, various modifications and changes may be made to some embodiments of this specification. Any modification, equivalent replacement, or improvement made without departing from the spirit and principle of some embodiments of this specification shall fall within the scope of the claims of this specification.

What is claimed is:

1. A payment method, comprising:
receiving, by a server from a client terminal, a request for acquiring a payment account for a transaction on a merchant terminal, wherein the request comprises a third-party payment institute corresponding to a geographical location of a user and identity information of the user, wherein the payment account is associated and compatible with the third-party payment institute;
identifying, by the server and based on the identity information of the user, the corresponding account of the user different from the payment account;

obtaining, by the server, from the third-party payment institute, the payment account based on the request;

sending, to the client terminal, the payment account for generating a payment digital object identifier (DOI) scannable by the merchant terminal by encoding information of the payment account;

receiving, by the server, a payment request from the merchant terminal scanning the payment DOI, wherein the payment request comprises the information of the payment account and order information of the transaction;

determining, by the server and based on the information of the payment account in the payment request, the corresponding account of the user; and completing, by the server, the transaction on the corresponding account of the user based on the order information of the transaction, wherein the transaction includes transferring of a monetary balance from the corresponding account of the user to a merchant account associated with the merchant terminal.

2. The method of claim 1, further comprising:

establishing, by the server, a correspondence between the payment account and the identity information of the user, and storing the correspondence; and sending, by the server, the payment account to the client terminal.

3. The method of claim 1, further comprising:

detecting, by the client terminal, the geographical location of the user; and determining, by the client terminal and based on the geographical location of the user, the third-party payment institute.

4. The method of claim 1, further comprising:

receiving, by the client terminal, a user instruction; and determining, by the client terminal and based on the user instruction, the third-party payment institute.

5. The method of claim 1, wherein the DOI is a 2-dimensional Quick Response (2-D QR) code, and the 2-D QR code uses one of Code 16K standard, Code 49 standard, PDF417 standard, and MicroPDF417 standard.

6. The method of claim 1, further comprising:

sending, by the merchant terminal, the payment request to the third-party payment institute for the third-party payment institute to identify the payment account; and receiving, by the server, from the third-party payment institute and after the payment account is successfully identified by the third-party payment institute, the payment request.

7. The method of claim 1, wherein the payment account is a gift card account.

8. One or more non-transitory computer-readable storage media storing instructions that, when executed by one or more processors, cause the one or more processors to perform operations comprising:

receiving, from a client terminal, a request for acquiring a payment account for a transaction on a merchant terminal, wherein the request comprises a third-party payment institute corresponding to a geographical location of a user and identity information of the user, wherein the payment account is associated and compatible with the third-party payment institute;

identifying based on the identity information of the user, a corresponding account of the user different from the payment account, the corresponding account being incompatible with the third-party payment institute;

obtaining, from the third-party payment institute, the payment account based on the request;

sending, to the client terminal, the payment account for generating a payment digital object identifier (DOI) scannable by the merchant terminal by encoding information of the payment account via an extensible markup language (xml) format;

receiving a payment request from the merchant terminal scanning the payment DOI, wherein the payment request comprises the information of the payment account and order information of the transaction;

determining, based on the information of the payment account in the payment request, the corresponding account of the user; and completing the transaction on the corresponding account of the user based on the order information of the transaction, wherein the transaction includes transferring of a monetary balance from the corresponding account of the user to a merchant account associated with the merchant terminal.

9. The one or more non-transitory computer-readable storage media of claim 8, wherein the operations further comprise:

establishing a correspondence between the payment account and the identity information of the user, and storing the correspondence; and sending the payment account to the client terminal.

10. The one or more non-transitory computer-readable storage media of claim 8, wherein the operations further comprise:

detecting, by the client terminal, the geographical location of the user; and determining, based on the geographical location of the user, the third-party payment institute.

11. The one or more non-transitory computer-readable storage media of claim 8, wherein the operations further comprise:

receiving a user instruction; and determining, based on the user instruction, the third-party payment institute.

12. The one or more non-transitory computer-readable storage media of claim 8, wherein the DOI is a 2-dimensional Quick Response (2-D QR) code, and the 2-D QR code uses one of Code 16K standard, Code 49 standard, PDF417 standard, and MicroPDF417 standard.

13. The one or more non-transitory computer-readable storage media of claim 8, wherein the operations further comprise:

sending the payment request to the third-party payment institute for the third-party payment institute to identify the payment account; and receiving from the third-party payment institute and after the payment account is successfully identified by the third-party payment institute, the payment request.

14. The one or more non-transitory computer-readable storage media of claim 8, wherein the payment account is a gift card account.

15. A system, comprising one or more processors and one or more non-transitory computer-readable storage media storing instructions that, when executed by the one or more processors, cause the system to perform operations comprising:

receiving, from a client terminal, a request for acquiring a payment account for a transaction on a merchant terminal, wherein the request comprises a third-party payment institute corresponding to a geographical location of a user and identity information of the user wherein the payment account is associated and compatible with the third-party payment institute;

identifying based on the identity information of the user, a corresponding account of the user different from the payment account, the corresponding account being incompatible with the third-party payment institute;

obtaining, from the third-party payment institute, the payment account based on the request;

sending, to the client terminal, the payment account for generating a payment digital object identifier (DOI) scannable by the merchant terminal by encoding information of the payment account via an extensible markup language (xml) format;

receiving a payment request from the merchant terminal scanning the payment DOI, wherein the payment request comprises the information of the payment account and order information of the transaction;

determining, based on the information of the payment account in the payment request, the corresponding account of the user; and completing the transaction on the corresponding account of the user based on the order information of the transaction, wherein the transaction includes transferring of a monetary balance from the corresponding account of the user to a merchant account associated with the merchant terminal.

16. The system of claim 15, wherein the operations further comprise:

establishing a correspondence between the payment account and the identity information of the user, and storing the correspondence; and sending the payment account to the client terminal.

* * * * *